Aug. 14, 1923.
A. J. TOWNSEND
1,465,241
WELDING MACHINE
Original Filed July 17, 1919    2 Sheets-Sheet 1
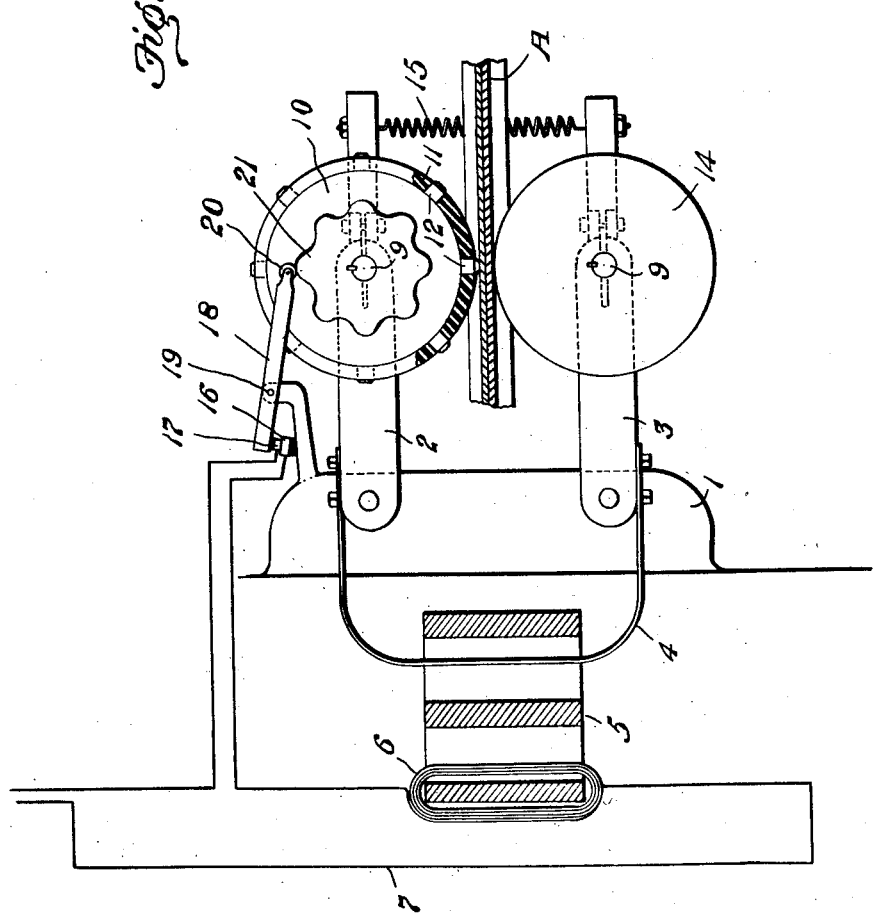
INVENTOR,
Arthur J. Townsend,
BY Frease, Merkel, Saywell and Bond
ATTYS.

Aug. 14, 1923.
A. J. TOWNSEND
1,465,241
WELDING MACHINE
Original Filed July 17, 1919   2 Sheets-Sheet 2
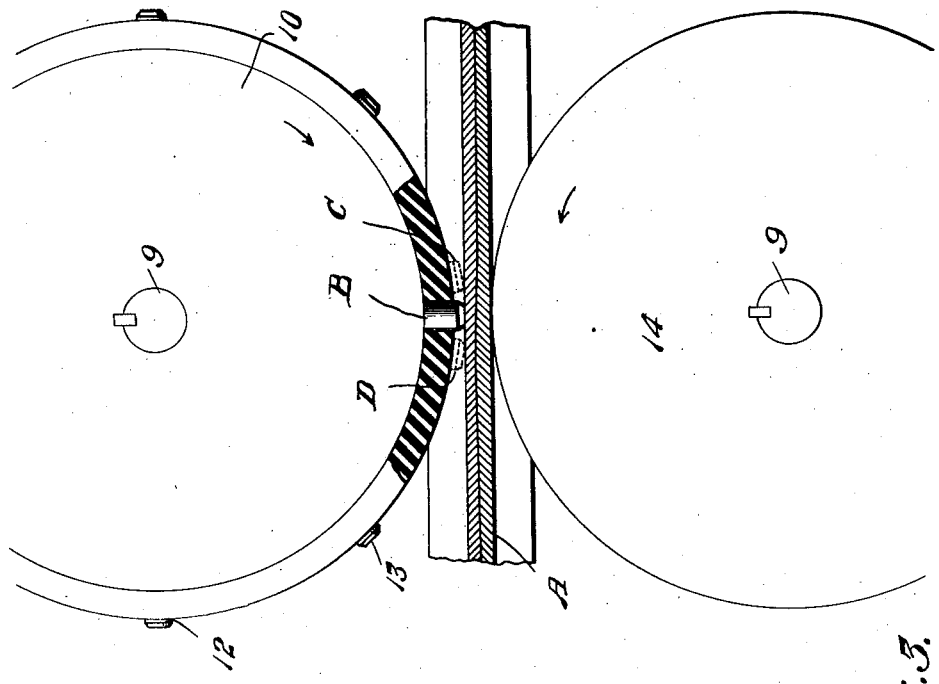
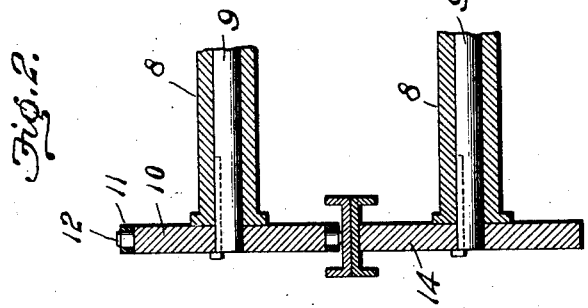
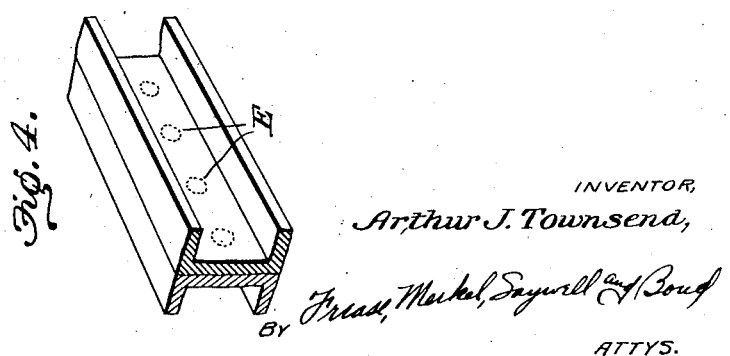
INVENTOR,
Arthur J. Townsend,
BY
ATTYS.

Patented Aug. 14, 1923.

1,465,241

UNITED STATES PATENT OFFICE.

ARTHUR J. TOWNSEND, OF CANTON, OHIO, ASSIGNOR TO THE FEDERAL MACHINE & WELDER COMPANY, OF WARREN, OHIO, A CORPORATION OF OHIO.

WELDING MACHINE.

Application filed July 17, 1919, Serial No. 311,410. Renewed September 27, 1922. Serial No. 590,999.

*To all whom it may concern:*

Be it known that I, ARTHUR J. TOWNSEND, a citizen of the United States, residing at Canton, in the county of Stark and State of Ohio, have invented a new and useful Welding Machine, of which the following is a specification.

This invention relates to welding machines and more especially to an electric welding machine designed for "spot" welding together structural forms such as channels, angle irons and the like, the machine being more particularly adapted for use in welding together pairs of pressed steel structural forms commonly known as metal lumber.

The objects of the invention are to provide an electric welding machine through which metal strips or structural forms may be fed in pairs, welding wheels being provided for welding the pair of strips or structural forms together at spaced intervals, one of the wheels being preferably provided at spaced points in its periphery with electrodes arranged to engage the surface of the metal strips or forms as they are fed between the wheels, these electrodes being connected to an electric circuit which is operatively connected to the other wheel, and to provide means for closing the circuit as each electrode contacts with the metal strips or forms and for breaking the circuit as the electrode moves out of contact with the metal.

With these objects in view the invention consists in the novel construction and arrangement of parts, hereinafter described, illustrated in the accompanying drawings, and particularly pointed out in the appended clams, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a side elevation of a machine embodying the invention.

Fig. 2 is a sectional view of the same.

Fig. 3 is an enlarged detail view of portions of the welding wheels showing the operation thereof.

Fig. 4 is a detail perspective view of two channel irons welded together.

A practical embodiment of the invention is disclosed in the accompanying drawings, forming a part of this specification in which similar numerals of reference indicate corresponding parts throughout the several views.

A portion of a suitable frame work upon which the device is supported is indicated generally by the numeral 1, a pair of spaced arms 2 and 3 being pivotally connected to said frame at their inner extremities. A thin band of copper 4 is connected at its extremities to the arms 2 and 3 and forms the secondary coil of a transformer 5, the primary coil 6 of which is located in an electric supply line 7.

It will be understood that the arms 2 and 3 are electrical conductors and that they carry the current from the transformer through the bearings and welding wheels to the strips or structural forms passing through the machine as will be hereinafter described.

Each of the arms 2 and 3 carries intermediate its extremities an elongated bearing 8, shafts 9 being journaled within said bearings. The shaft carried in the upper bearing has mounted thereon a metallic wheel 10 provided around its periphery with an insulated tire 11, electrodes 12 being provided upon the periphery of the wheel at spaced intervals and extending through the insulated tire and beyond the periphery thereof, each of these electrodes being preferably provided with a frustoconical outer extremity 13.

The shaft in the lower bearing has mounted thereon a metallic wheel 14 and suitable means is provided for drawing the arms 2 and 3 toward each other, such for instance as the coil spring 15 which connects the free extremities of the arms.

The strips or structural forms to be welded together are placed in the proper position in pairs and passed between the wheels 10 and 14. These strips or structural forms are indicated generally by the letter "A" and may be fed through the welding wheels by any suitable means such as feed rolls, or the welding wheels may be driven by suitable gearing to feed the strips or structural forms through the machine.

It is preferable that the current from the transformer pass through the welding wheels only at the time that the electrodes 12 are in contact with the metal being welded and the best results may be obtained by making the circuit just after each electrode contacts with the metal and breaking the circuit just before the electrode leaves the surface of the metal.

In Fig. 3 is illustrated on an enlarged scale a detail of portions of the welding wheels showing a pair of structural forms passing between the wheels. One electrode indicated by the letter "B" is shown in contact with the surface of the adjacent structural form and assuming that the wheels are rotating in the direction of the arrows shown thereon, the dotted lines "C" indicate the position of the electrode "B" as it first comes into contact with the surface of the metal and the dotted lines "D" indicate the position of the electrode as it leaves the surface of the metal and the circuit should be preferably made and broken between the positions "C" and "D."

For the purpose of illustrating one manner in which the circuit may be thus made and broken intermittently the supply line 7 is shown connected with a fixed contact point 16 and a movable contact point 17 arranged to close the circuit to the coils 6 when they are engaged and to break the circuit when the contact point 17 is removed from the point 16. The contact point 17 is carried upon and insulated from a lever 18 pivoted at 19 upon the frame 1, a roller 20 being provided upon the other extremity of said lever and engaging the cam wheel 21 rotatable with the wheel 10.

This cam wheel is of proper form to move the lever 18 sufficiently to bring the contact point 17 thereon into engagement with the fixed contact point 16 at the desired point, after each electrode has come into contact with the surface of the material to be welded and to move said lever sufficiently to break the contact between the points 16 and 17 at the desired point prior to the breaking of the contact between each electrode and the metal to be welded.

Thus it will be seen that in the operation of the device that as a pair of strips or structural forms are passed between the welding wheels they will be "spot" welded together at the points where the electrodes contact with the metal strips or forms as indicated by the letter E in Fig. 4.

It will of course be understood that although the showing illustrated in the accompanying drawings is intended for welding together narrow strips or structural forms that this machine is adaptable for use upon strips or forms of any width and that two or more sets of welding wheels may be located in alignment to produce two or more longitudinal rows of welds, such as indicated by the letter E, in Fig. 4, upon the strips or structural forms as they pass through the machine.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:—

1. A welding machine comprising a base, a pair of arms pivotally mounted upon said base, means for normally urging said arms toward each other, a transformer, the secondary coil of said transformer connected to each of said arms, a welding wheel carried by each arm, the material to be welded being adapted to be passed between said wheels, and spaced electrodes located around the periphery of one wheel and arranged to engage the material.

2. A welding machine comprising a pair of welding wheels between which the material to be welded is passed, an insulated periphery upon one of said wheels, spaced electrodes extending through said insulation and means for passing electric current through the wheels.

3. A welding machine comprising a pair of welding wheels between which the material to be welded is to be passed, an insulated periphery upon one wheel, spaced electrodes extending through said insulation and arranged to contact with the material and means for passing electric current through the wheels while each electrode is in engagement with the material.

In testimony that I claim the above, I have hereunto subscribed my name.

ARTHUR J. TOWNSEND.